(12) United States Patent
Mate et al.

(10) Patent No.: US 11,438,731 B2
(45) Date of Patent: Sep. 6, 2022

(54) METHOD AND APPARATUS FOR INCORPORATING LOCATION AWARENESS IN MEDIA CONTENT

(71) Applicant: Nokia Technologies Oy, Espoo (FI)

(72) Inventors: Sujeet Shyamsundar Mate, Tampere (FI); Emre Baris Aksu, Tampere (FI); Miska Matias Hannuksela, Tampere (FI); Igor Danilo Diego Curcio, Tampere (FI); Kashyap Kammachi-Sreedhar, Tampere (FI); Ville-Veikko Mattila, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/823,749

(22) Filed: Mar. 19, 2020

(65) Prior Publication Data

US 2020/0304949 A1 Sep. 24, 2020

Related U.S. Application Data

(60) Provisional application No. 62/820,738, filed on Mar. 19, 2019.

(51) Int. Cl.
*G09G 5/00* (2006.01)
*H04W 4/02* (2018.01)
(Continued)

(52) U.S. Cl.
CPC ............. *H04W 4/026* (2013.01); *G06F 3/011* (2013.01); *G06T 19/006* (2013.01)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS 5,276,785 A * 1/1994 Mackinlay .......... G06F 3/04815
345/427
2011/0173565 A1 7/2011 Ofek et al.
(Continued)

FOREIGN PATENT DOCUMENTS

WO WO 2017/202899 A1 11/2017

OTHER PUBLICATIONS

Extended European Search Report for Application No. 20164096.8 dated Jul. 29, 2020, 7 pages.
(Continued)

*Primary Examiner* — Gordon G Liu
(74) *Attorney, Agent, or Firm* — Alston & Bird LLP

(57) ABSTRACT

A method, apparatus and computer program product creates a viewpoint position structure for media content. The viewpoint position structure specifies a position of a viewpoint defined in a reference coordinate system and an offset of the reference coordinate system with respect to a geographical reference. The method, apparatus and computer program product cause storage of the viewpoint position structure. An indication may be created as to whether the media content is augmented reality media content. The augmented reality media content may comprise a background that is at least partially transparent. The offset may be determined, within the reference coordinate system, relative to a geomagnetic reference direction, based upon one or more of a viewpoint yaw angle, a viewpoint pitch angle, or a viewpoint roll angle.

20 Claims, 3 Drawing Sheets

(51) Int. Cl.
    *G06F 3/01*     (2006.01)
    *G06T 19/00*     (2011.01)

(58) Field of Classification Search
    USPC .......................................................... 345/633
    See application file for complete search history.

(56) References Cited

U.S. PATENT DOCUMENTS

| | | | |
|---|---|---|---|
| 2014/0195651 A1* | 7/2014 | Stockhammer | H04N 21/26258 709/219 |
| 2016/0258756 A1* | 9/2016 | Ukezono | G06F 13/385 |
| 2018/0005450 A1* | 1/2018 | Daniels | G06T 19/006 |
| 2018/0061002 A1 | 3/2018 | Lee et al. | |
| 2018/0189958 A1 | 7/2018 | Budagavi et al. | |
| 2018/0298743 A1* | 10/2018 | Sullivan | E21B 44/00 |
| 2018/0373328 A1* | 12/2018 | Sawaki | G06Q 30/0277 |

OTHER PUBLICATIONS

Yu et al., *A Framework to Evaluate Omnidirectional Video Coding Schemes*, 2015 IEEE International Symposium on Mixed and Augmented Reality (Sep. 1, 2015) pp. 31-36.
Berners-Lee, T. et al., *Uniform Source Identifier (UR): Generic Syntax*, RFC 3986 (Jan. 2005), 61 pages.
Moats, R., *URN Syntax*, RFC 2141 (May 1997) 8 pages.
Pettersson, M. et al., *[OMAF] On AR Support in OMAF*, ISO/IEC JTC1/SC29/WG11 MPEG2019/m45874 (Jan. 2019) 5 pages.
Information Technology—Coded Representation of Immersive Media (MPEG-I)—Part 2: Omnidirectional Media, ISO/IEC FDIS 23090-2 OMAF v1 w17563, (Apr. 26, 2018) 182 pages.
Wang, Y-K. et al., *WD of ISO/IEC 23090-2 $2^{nd}$ Edition OMAF $2^{nd}$ Edition*, ISO/IEC JTC1/SC29/WG11 N18227-v1 (Jan. 2019) 226 pages.
ISO/IEC 23009-1, Information Technology—Dynamic Adaptive Streaming Over HTTP (DASH)—Part 1: Media Presentation Description and Segment Formats (May 15, 2014) 152 pages.
ISO/IEC 23090-2, Information Technology—Coded Representation of Immersive Media—Part 2: Omnidirectional Media Format (Jan. 2019) 19 pages.
ISO/IEC 14496-12, Information Technology—Coding of Audio-Visual Objects—Part 12: ISO Base Media File Format (Oct. 15, 2008) 120 pages.
ISO/IEC 14496-14, Information Technology—Coding of Audio-Visual Objects—Part 14: MP4 File Format (Nov. 15, 2003) 18 pages.
ISO/IEC 14496-15, Information Technology—Coding of Audio-Visual Objects—Part 15: Advanced Video Coding (AVC) File Format (Apr. 15, 2004) 29 pages.
3GPP TS 26.234 V15.1.0, $3^{rd}$ Generation Partnership Project; Technical Specification Group Services and System Aspects; Transparent End-To-End Packet-Switched Streaming Service (PSS); Protocols and Codecs (Release 15) (Sep. 2018) 174 pages.
3GPP TS 26.244 V15.0.0, $3^{rd}$ Generation Partnership Project; Technical Specification Group Services and System Aspects; Transparent End-To-End Packet Switched Streaming Service (PSS); 3GPP File Format (3GP) (Release 15) (Jun. 2018) 67 pages.
Office Action for European Application No. 20164096.8 dated Feb. 18, 2022, 6 pages.

\* cited by examiner

METHOD AND APPARATUS FOR INCORPORATING LOCATION AWARENESS IN MEDIA CONTENT

CROSS-REFERENCE TO RELATED APPLICATIONS

This application claims priority to, and the benefit of, U.S. Provisional Patent Application No. 62/820,738, filed Mar. 19, 2019, entitled Method and Apparatus for Incorporating Location Awareness in Media Content," the entire disclosures of which are hereby incorporated herein by reference in their entireties for all purposes.

TECHNOLOGICAL FIELD

Some embodiments relate generally to a method, apparatus and computer program product for aligning coordinates in virtual reality media content with real world location.

BACKGROUND

Virtual reality audiovisual content, such as 360° video and other similar content, has become increasingly popular amongst viewers and content creators who prefer or otherwise enjoy the immersive viewing experience available from such content. This increase in the popularity of virtual reality (VR) and augmented reality (AR) content has driven viewer demand for streaming virtual reality content that provides a high-quality viewing experience.

The consumption of immersive multimedia, such as omnidirectional content consumption for virtual reality and other applications, is more complex for a client than the consumption of two-dimensional content. This increased complexity is attributable to the higher degrees of freedom available to the client when consuming immersive multimedia.

The omnidirectional media application format (OMAF) version 1 (v1) standard defines omnidirectional streaming of content having three degrees of freedom. OMAF defines formats for enabling the access and delivery of omnidirectional media.

A user initiates watching a VR scene describing the points of interest in his vicinity as different viewpoints. When he puts on an AR/VR head-mounted display (HMD), the viewpoints in VR content are spatially aligned with the real-world points of interest (POI). Accordingly, even if the user moves around without any HMD and puts HMD back on for watching the user experience, the user would still be able to have a coherent experience. The same can be done with a conventional mobile device display with a motion sensor and geolocation sensor.

By spatially aligning VR content viewpoints to coincide with real-world locations or points of interest (POIs), the utility of VR can be expanded for tourism, training, education, or the like. However, a common reference coordinate system in VR does not have any relationship with real world coordinates (absolute real world coordinates such as latitude and longitude or relative coordinates such as indoor position system coordinates).

BRIEF SUMMARY

A method, apparatus and computer program product are provided in accordance with some embodiments in order to align coordinates in virtual reality media content with real world location.

In one example embodiment, a method is provided that includes creating a viewpoint position structure for media content. In some embodiments, the method further includes causing storage of the viewpoint position structure. In some embodiments, the viewpoint position structure specifies a position of a viewpoint defined in a reference coordinate system and/or an offset of the reference coordinate system with respect to a geographical reference. In some embodiments, the method can further comprise creating an indication whether the media content is augmented reality media content. In some embodiments, the augmented reality media content comprises a background that is at least partially transparent. In some embodiments, the indication whether the media content is augmented reality media content is signaled in the viewpoint position structure. In some embodiments, the indication whether the media content is augmented reality media content is signaled in a Dynamic Adaptive Streaming over Hypertext transfer protocol (DASH) descriptor. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

In some implementations of such a method, the viewpoint position structure further specifies whether the media content is augmented reality media content. In some embodiments, the viewpoint position structure further specifies whether the media content is augmented reality media content. In some embodiments, the viewpoint position structure further comprises a viewpoint group description for the viewpoint. In some embodiments, the viewpoint position structure further comprises a flag indicating that the offset of the reference coordinate system with respect to a geographical reference is present and the viewpoint position structure further defines a real world position with respect to the geographical reference as a requirement for rendering of the media content.

In another example embodiment, an apparatus is provided that includes processing circuitry and at least one memory including computer program code for one or more programs with the at least one memory and the computer program code configured to, with the processing circuitry, cause the apparatus at least to create a viewpoint position structure for media content. In some embodiments, the computer program code is further configured to, with the at least one processor, cause the apparatus to cause storage of the viewpoint position structure. In some embodiments, the viewpoint position structure specifies a position of a viewpoint defined in a reference coordinate system and an offset of the reference coordinate system with respect to a geographical reference. In some embodiments, the at least one memory and the computer program code are further configured to, with the at least one processor, cause the apparatus to: create an indication whether the media content is augmented reality media content. In some embodiments, the augmented reality media content comprises a background that is at least partially transparent. In some embodiments, the indication whether the media content is augmented reality media content is signaled in the viewpoint position structure. In some embodiments, the indication whether the media content is augmented reality media content is signaled in a Dynamic Adaptive Streaming over Hypertext transfer protocol (DASH) descriptor. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

In some implementations of such an apparatus, the viewpoint position structure further specifies whether the media content is augmented reality media content. In some embodiments, the viewpoint position structure further specifies whether the media content is augmented reality media content. In some embodiments, the viewpoint position structure further comprises a viewpoint group description for the viewpoint. In some embodiments, the viewpoint position structure further comprises a flag indicating that the offset of the reference coordinate system with respect to a geographical reference is present and the viewpoint position structure further defines a real world position with respect to the geographical reference as a requirement for rendering of the media content.

In one example embodiment, a computer program product is provided that includes at least one non-transitory computer-readable storage medium having computer executable program code instructions stored therein with the computer executable program code instructions comprising program code instructions configured, upon execution, to create a viewpoint position structure for media content. In some embodiments, the computer executable program code instructions comprise program code instructions are further configured, upon execution, to cause storage of the viewpoint position structure. In some embodiments, the viewpoint position structure specifies a position of a viewpoint defined in a reference coordinate system and an offset of the reference coordinate system with respect to a geographical reference. In some embodiments, the computer executable program code instructions further comprise program code instructions configured, upon execution, to: create an indication whether the media content is augmented reality media content. In some embodiments, the augmented reality media content comprises a background that is at least partially transparent. In some embodiments, the indication whether the media content is augmented reality media content is signaled in the viewpoint position structure. In some embodiments, the indication whether the media content is augmented reality media content is signaled in a Dynamic Adaptive Streaming over Hypertext transfer protocol (DASH) descriptor. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

In some implementations of such a computer program product, the viewpoint position structure further specifies whether the media content is augmented reality media content. In some embodiments, the viewpoint position structure further specifies whether the media content is augmented reality media content. In some embodiments, the viewpoint position structure further comprises a viewpoint group description for the viewpoint. In some embodiments, the viewpoint position structure further comprises a flag indicating that the offset of the reference coordinate system with respect to a geographical reference is present and the viewpoint position structure further defines a real world position with respect to the geographical reference as a requirement for rendering of the media content.

In one example embodiment, an apparatus is provided that includes means for creating a viewpoint position structure for media content. In some embodiments, the apparatus further includes means for causing storage of the viewpoint position structure. In some embodiments, the viewpoint position structure specifies a position of a viewpoint defined in a reference coordinate system and an offset of the reference coordinate system with respect to a geographical reference. In some embodiments, the apparatus can further comprise means for creating an indication whether the media content is augmented reality media content. In some embodiments, the augmented reality media content comprises a background that is at least partially transparent. In some embodiments, the indication whether the media content is augmented reality media content is signaled in the viewpoint position structure. In some embodiments, the indication whether the media content is augmented reality media content is signaled in a Dynamic Adaptive Streaming over Hypertext transfer protocol (DASH) descriptor. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

In some implementations of such an apparatus, the viewpoint position structure further specifies whether the media content is augmented reality media content. In some embodiments, the viewpoint position structure further specifies whether the media content is augmented reality media content. In some embodiments, the viewpoint position structure further comprises a viewpoint group description for the viewpoint. In some embodiments, the viewpoint position structure further comprises a flag indicating that the offset of the reference coordinate system with respect to a geographical reference is present and the viewpoint position structure further defines a real world position with respect to the geographical reference as a requirement for rendering of the media content.

In some embodiments, an apparatus can be provided that comprises: means for creating a viewpoint position structure for media content, wherein the viewpoint position structure specifies: a position of a viewpoint defined in a reference coordinate system, and an offset of the reference coordinate system with respect to a geographical reference; and means for causing storage of the viewpoint position structure. In some embodiments, the apparatus can further comprise: means for creating an indication whether the media content is augmented reality media content. In some embodiments, the augmented reality media content comprises a background that is at least partially transparent. In some embodiments, the indication whether the media content is augmented reality media content is signaled in the viewpoint position structure. In some embodiments, the indication whether the media content is augmented reality media content is signaled in a Dynamic Adaptive Streaming over Hypertext transfer protocol (DASH) descriptor. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

In some embodiments, a method can be carried out that comprises: creating a viewpoint position structure for media content, wherein the viewpoint position structure specifies: a position of a viewpoint defined in a reference coordinate system, and an offset of the reference coordinate system with respect to a geographical reference; the method further comprising: causing storage of the viewpoint position structure. In some embodiments, the method can further comprise: creating an indication whether the media content is augmented reality media content. In some embodiments, the augmented reality media content comprises a background that is at least partially transparent. In some embodiments, the indication whether the media content is augmented reality media content is signaled in the viewpoint position structure. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

In some embodiments, a computer-readable storage medium can be provided that has computer executable program code instructions stored therein. In some embodiments, the computer executable program code instructions can comprise program code instructions configured, upon execution, to: create a viewpoint position structure for media content, wherein the viewpoint position structure specifies: a position of a viewpoint defined in a reference coordinate system; and an offset of the reference coordinate system with respect to a geographical reference; the program code instructions further configured, upon execution, to: cause storage of the viewpoint position structure. In some embodiments, the computer executable program code instructions can further comprise program code instructions configured, upon execution, to: create an indication whether the media content is augmented reality media content. In some embodiments, the augmented reality media content comprises a background that is at least partially transparent. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

BRIEF DESCRIPTION OF THE DRAWINGS

Figure 1B:
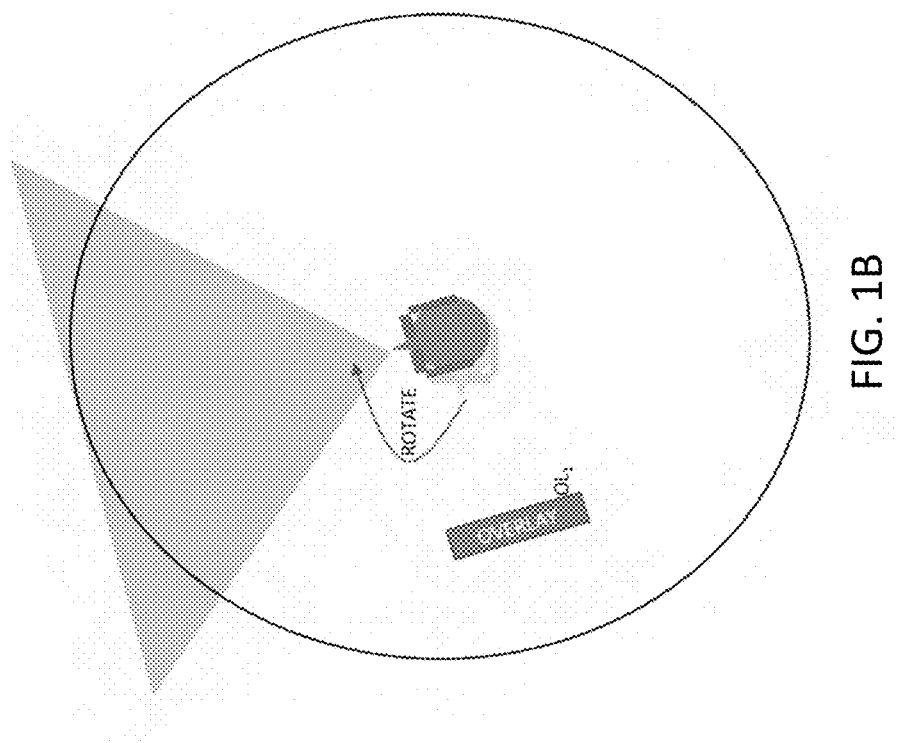
Figure 1A:
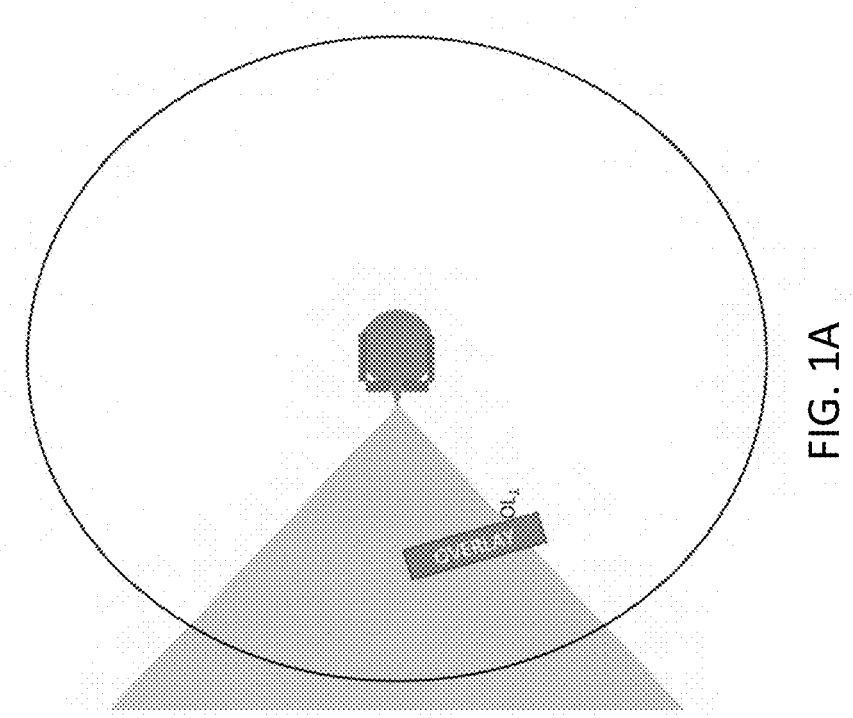
Figure 2:
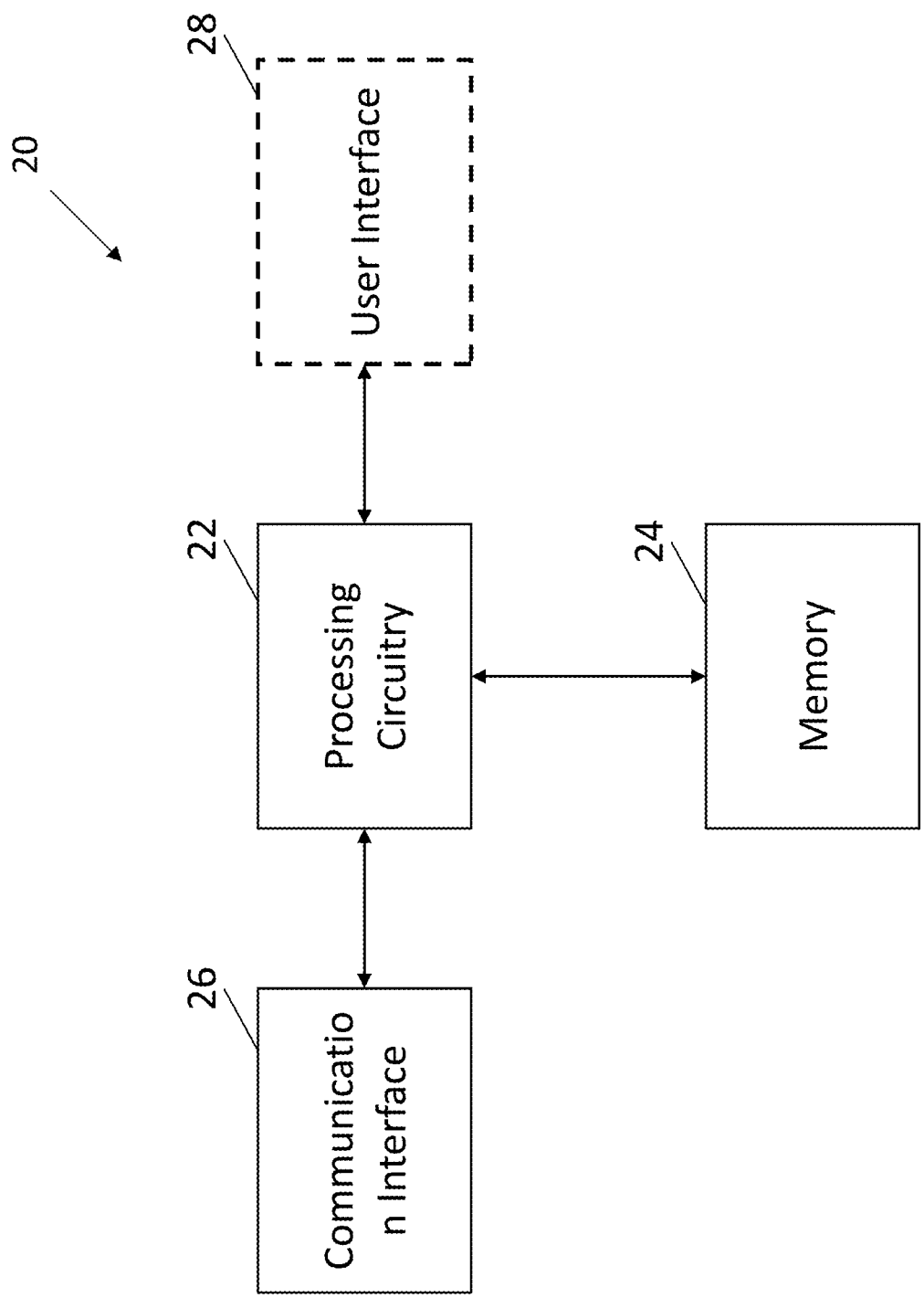
Figure 3:
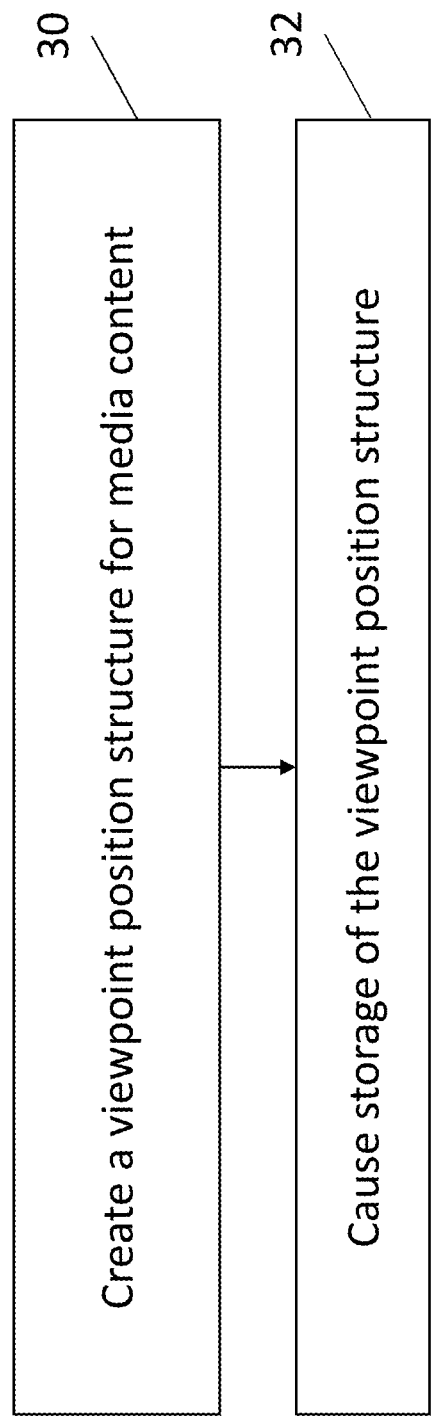

Having thus described certain example embodiments of the present disclosure in general terms, reference will hereinafter be made to the accompanying drawings, which are not necessarily drawn to scale, and wherein:

FIGS. 1A and 1B are graphical representations of an instance where a user's field of view rotates during omnidirectional media content playback referenced in connection with describing some of the example embodiments contained herein;

FIG. 2 is a block diagram of an apparatus that may be specifically configured in accordance with an example embodiment of the present invention; and FIG. 3 is a flowchart illustrating a set of operations performed, such as by the apparatus of FIG. 2, in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As used herein the term "omnidirectional content" refers to media content that has greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than a 360 degree view in the horizontal direction and/or less than a 180 degree view in the vertical direction.

As used herein the term "observation point or Viewpoint" refers to a volume in a three-dimensional space for virtual reality audio/video acquisition or playback. In one example embodiment, a Viewpoint is a trajectory, such as a circle, a region, or a volume, around the center point of a device or rig used for omnidirectional audio/video acquisition and the position of the observer's head in the three-dimensional space in which the audio and video tracks are located. A viewpoint can also be described as omnidirectional media corresponding to one omnidirectional camera, the observer's head position can be at the position of the viewpoint. In some cases, an observer's head position is tracked and the rendering is adjusted for head movements in addition to head rotations, and then a Viewpoint may be understood to be an initial or reference position of the observer's head. In implementations utilizing DASH (Dynamic adaptive streaming over HTTP), each observation point may be defined as a viewpoint by a viewpoint property descriptor. The definition may be stored in the ISOBMFF (International Standards Organization (ISO) base media file format (ISO/IEC 14496-12)) or OMAF type of file format. The delivery could be HLS (HTTP Live Streaming), RTSP/RTP (Real Time Streaming Protocol/Real-time Transport Protocol) streaming in addition to DASH.

As used herein, the term "Viewpoint group" refers to one or more Viewpoints that are either spatially related or logically related. The Viewpoints in a Viewpoint group may be defined based on relative positions defined for each Viewpoint with respect to a designated origin point of the group (also referred to herein as "a common reference coordinate system," "a reference coordinate system," or "a coordinate system"). Each Viewpoint group may also include a default Viewpoint that reflects a default playback starting point when a user starts to consume audio-visual content in the Viewpoint group, without choosing a Viewpoint, for playback. The default Viewpoint may be the same as the designated origin point. In some embodiments, one Viewpoint may be included in multiple Viewpoint groups.

As used herein, the term "spatially related Viewpoint group" refers to Viewpoints which have content that has a spatial relationship between them. For example, content captured by VR cameras at different locations in the same basketball court or a music concert captured from different locations on the stage may comprise spatially related Viewpoint groups.

As used herein, the term "logically related Viewpoint group" refers to related Viewpoints which do not necessarily have a clear spatial relationship, but are logically related. The relative position of logically related Viewpoints are described based on the creative intent. For example, two Viewpoints that are members of a logically related Viewpoint group may correspond to content from the performance area and the dressing room. Another example could be two Viewpoints from the dressing rooms of the two competing teams that form a logically related Viewpoint group to permit users to traverse between both teams to see the player reactions.

As used herein, the term "static Viewpoint" refers to a Viewpoint that remains stationary during one virtual reality audio/video acquisition and playback session. For example, a static Viewpoint may correspond with virtual reality audio/video acquisition performed by a fixed camera.

As used herein, the term "dynamic Viewpoint" refers to a Viewpoint that does not remain stationary during one virtual reality audio/video acquisition and playback session. For example, a dynamic Viewpoint may correspond with virtual reality audio/video acquisition performed by a moving camera on rails or a moving camera on a flying drone.

As used herein, the term "viewing setup" refers to a setup of one or more Viewpoints and viewing orientations. In the context of a presentation that has only one Viewpoint available, the Viewpoint need not be explicitly indicated or concluded for a viewing setup. If a presentation has multiple Viewpoints available, the Viewpoints will be setup based on one or more Viewpoint groups, and the spatial or logical relationship between Viewpoints in each Viewpoint group will be indicated in the viewing setup.

A method, apparatus and computer program product are provided in accordance with some embodiments in order to facilitate grouping of entities in media content. The method, apparatus and computer program product may be utilized in conjunction with a variety of video formats including High Efficiency Video Coding standard (HEVC or H.265/HEVC), Advanced Video Coding standard (AVC or H.264/AVC), the upcoming Versatile Video Coding standard (VVC or H.266/VVC), and/or with a variety of video and multimedia file formats including International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), and file formats for NAL (Network Abstraction Layer) unit structured video (ISO/IEC 14496-15) and $3^{rd}$ Generation Partnership Project (3GPP file format) (3GPP Technical Specification 26.244, also known as the 3GP format). ISOBMFF is the base for derivation of all the above mentioned file formats.

Some aspects of the disclosure relate to container file formats, such as International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), and file formats for NAL (Network Abstraction Layer) unit structured video (ISO/IEC 14496-15) and $3^{rd}$ Generation Partnership Project (3GPP file format) (3GPP Technical Specification 26.244, also known as the 3GP format). An example embodiment is described in conjunction with the ISOBMFF or its derivatives, however, the present disclosure is not limited to ISOBMFF, but rather the description is given for one possible basis on top of which some embodiments of the present disclosure may be partly or fully realized.

Virtual reality audiovisual content, such as 360° video and other similar content, has become increasingly popular amongst viewers and content creators who prefer or otherwise enjoy the immersive viewing experience available from such content. This increase in the popularity of virtual reality (VR) and augmented reality (AR) content has driven viewer demand for streaming virtual reality content that provides a high-quality viewing experience.

The consumption of immersive multimedia, such as omnidirectional content consumption for virtual reality and other applications, is more complex for a client than the consumption of two-dimensional content. This increased complexity is attributable to the higher degrees of freedom available to the client when consuming immersive multimedia.

The omnidirectional media application format (OMAF) version 1 (v1) standard defines omnidirectional streaming of content having three degrees of freedom. OMAF defines formats for enabling the access and delivery of omnidirectional media.

By way of example, a user initiates watching a VR scene describing the points of interest in his vicinity as different viewpoints. When he puts on an AR/VR head-mounted display (HMD), the viewpoints in VR content are spatially aligned with the real-world points of interest (POIs). Accordingly, even if the user moves around without any HMD and puts HMD back on for watching the user experience, the user would still be able to have a coherent experience with the viewpoints in the VR content remaining spatially aligned with the real-world POIs. The same can be done with a conventional mobile device display with a motion sensor.

By spatially aligning VR content viewpoints to coincide with real-world locations or POIs, the utility of VR can be expanded for tourism, training, education, or the like. However, the common reference coordinate system in VR does not have any relationship with real world coordinates. Therefore, there is a need to align the virtual content rendered with location awareness.

In addition, OMAF has additional issues related to AR. Currently, there is no support to specify that a particular viewpoint related content is for AR consumption. This specification that certain viewport related content is for AR consumption is important to ensure that the augmentation content is located appropriately. It may not be possible to view the virtual content from a random position (when the corresponding real world object is not visible in a particular orientation and size). This restriction is specifically an AR requirement. Currently, OMAF does not support indicating that: 1) the background content e.g., the 360 degree VR content is not the priority; and 2) background content may be at least partially transparent or see-through content whereas the server delivered content is only the overlay content. Therefore, there is a need to address such issues.

Certain embodiments of the disclosure may be utilized in conjunction with any suitable positioning system and coordinates related to that system may be used to specify the common reference coordinate system origin or the position of at least one viewpoint in a viewpoint group.

In some embodiments, a reference point may be defined, such as with magnetic North, true North or a pre-determined reference signal being used to provide a reference point. If there are multiple viewpoint groups, then the offset with respect to the reference point, such as magnetic north, may need to be defined separately for each group. At least one viewpoint of each viewpoint group or the origin of each viewpoint group may need to have its position specified with respect to the chosen positioning system.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises still images that are stored as items and image sequences that are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Any number of image items can be included in the same file. Given a collection of images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

A panoramic image covering a 360-degree field-of-view horizontally and a 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases panoramic content with a 360-degree horizontal field-of-view but with less than a 180-degree vertical field-of-view may be considered special cases of equirectangular projection, where the polar areas of the sphere have not been mapped onto the two-dimensional image plane. In some cases panoramic content may have less than a 360-degree horizontal field-of-view and up to a 180-degree vertical field-of-view, while otherwise having the characteristics of an equirectangular projection format.

In cube map projection format, spherical video is projected onto the six faces (a.k.a. sides) of a cube. The cube map may be generated e.g. by first rendering the spherical scene six times from a viewpoint, with the views defined by a 90 degree view frustum representing each cube face. The cube sides may be frame-packed into the same frame or each cube side may be treated individually (e.g., in encoding). There are many possible orders of locating cube sides onto a frame and/or cube sides may be rotated or mirrored. The frame width and height for frame-packing may be selected to fit the cube sides "tightly" e.g. a 3×2 cube side grid, or may include unused constituent frames e.g. a 4×3 cube side grid.

In general, 360-degree content can be mapped onto different types of solid geometrical structures, such as a polyhedron (that is, a three-dimensional solid object containing flat polygonal faces, straight edges and sharp corners or vertices, e.g., a cube or a pyramid), a cylinder (by projecting a spherical image onto the cylinder, as described above with the equirectangular projection), a cylinder (directly without projecting onto a sphere first), a cone, etc. and then unwrapped to a two-dimensional image plane. The two-dimensional image plane can also be regarded as a geometrical structure. In other words, 360-degree content can be mapped onto a first geometrical structure and further unfolded to a second geometrical structure. However, it may be possible to directly obtain the transformation to the second geometrical structure from the original 360-degree content or from other wide view visual content. In general, an omnidirectional projection format may be defined as a format to represent (up to) 360-degree content on a two-dimensional image plane. Examples of omnidirectional projection formats include the equirectangular projection format and the cubemap projection format.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV). In the following, the horizontal field-of-view of the viewport will be abbreviated with HFoV and, respectively, the vertical field-of-view of the viewport will be abbreviated with VFoV.

A sphere region may be defined as a region on a sphere that may be specified by four great circles or by two azimuth circles and two elevation circles and additionally by a tile angle indicating rotation along the axis originating from the sphere origin passing through the center point of the sphere region. A great circle may be defined as an intersection of the sphere and a plane that passes through the center point of the sphere. A great circle is also known as an orthodrome or Riemannian circle. An azimuth circle may be defined as a circle on the sphere connecting all points with the same azimuth value. An elevation circle may be defined as a circle on the sphere connecting all points with the same elevation value.

The Omnidirectional Media Format ("OMAF") standard (ISO/IEC 23090-2) specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be a recommended viewport per the director's cut, e.g., a viewport suggested according to the creative intent of the content author or content provider.

Videos and/or images may be overlaid on an omnidirectional video and/or image. The coded overlaying video can be a separate stream or part of the bitstream of the currently rendered 360-degree video/image. An omnidirectional streaming system may overlay a video/image on top of the omnidirectional video/image being rendered. The overlaid two-dimensional video/image may have a rectangular grid or a non-rectangular grid. The overlaying process may cover the overlaid video/image or a part of the video/image or there may be some level of transparency/opacity or more than one level of transparency/opacity wherein the overlaid video/image may be seen under the overlaying video/image but with less brightness. In other words, there could be an associated level of transparency corresponding to the video/image in a foreground overlay and the video/image in the background (video/image of VR scene). The terms opacity and transparency may be used interchangeably.

The overlaid region may have one or more than one level of transparency. For example, the overlaid region may have different parts with different levels of transparency. In accordance with some embodiments, the transparency level could be defined to be within a certain range, such as from 0 to 1 so that the smaller the value the smaller is the transparency, or vice versa. Additionally, the content provider may choose to overlay a part of the same omnidirectional video over the current viewport of the user. The content provider may want to overlay the video based on the viewing condition of the user. For example, overlaying may be performed, if the user's viewport does not match the content provider's recommended viewport. In this case, the client player logic overlays the content provider's recommended viewport (as a preview window) on top of the current viewport of the user. It may also be possible to overlay the recommended viewport, if the user's current viewport does not match, such that the position of the overlaid video is based on the direction in which the user is viewing. For example, the recommended viewport may be overlaid to the left of the display, if the recommended viewport is to the left of the user's current viewport. It may also be possible to overlay the whole 360-degree video. Yet another example is to use the overlaying visual information as a guidance mechanism to guide the user towards the recommended viewport, for example guiding people who are hearing impaired.

There may be one or more conditions on when and how to display the visual overlay. Therefore, a rendering device may need to receive information which the rendering device may use to perform the overlaying as indicated by the signalled information.

One or more overlays may be carried in a single visual media track or a single image item. When more than one overlay is carried in a single track or image item, or when an overlay is carried with other media (e.g. background), a mapping of regions from the samples of the track or the image item to the overlay metadata may be provided, e.g. in or associated with the OverlayStruct.

When several tracks or image items are collectively carrying one or more overlays and/or the background visual media, a group of the tracks and image items may be indicated in a container file. For example, an entity group of ISOBMFF may be used for this purpose.

An overlay may fall outside the user's field of view (FOV), e.g., a viewport of a user becomes non-overlapping with the overlay. For example, as illustrated in FIGS. 1A and 1B, after a user 10 rotates during omnidirectional media content playback, the viewport 12 of the user 10 become non-overlapping with the visual overlay 14. Depending on the specific situation, it may be desirable to continue or pause the playback of the overlay when the user is not watching the overlay. For example, it may be desirable to pause a timeline of overlay playback until the overlay overlaps again with the user's viewport. It may also be desirable to continue playback of the overlay even though the overlay is outside the user's viewport. Therefore, a mechanism that supports multiple timelines of playback which in turn enables custom overlay playback/pause independent of the base content would be advantageous. Accordingly, a method, apparatus and computer program product are provided in accordance with some embodiments in order to enable multiple timeline support in playback of omnidirectional media content with overlay which in turn enables customized overlay playback behavior dependent on whether the overlay overlaps with the viewport of the user.

The ISOBMFF extension in OMAF v2 specifies, OverlaySwitchAlternativesBox, an Entity grouping with grouping_type equal to 'oval' which groups overlay tracks and image items based on if they are intended to be presented as a user-switchable alternative for another overlay in the same entity group. The syntax of the OverlaySwitchAlternativesBox may be as shown below:

```
aligned(8) class OverlaySwitchAlternativesBox(version, flags)
extends EntityToGroupBox('oval', version, flags) {
    // conditionally optional
    for(i=0; i<num_entities_in_group; i++)
        unsigned int(16) ref_overlay_id[i];
}
``` ref_overlay_id[i] specifies the overlay_id from the track or image item identified by the i-th entity_id that is a switchable overlay in this group. The i-th referenced track or image item may have an overlay_id equal to the ref_overlay_id[i] that is present. If each of the tracks and image items identified by the entity_id values of this entity group contains exactly one overlay, ref_layer_id[i] syntax elements may or may not be present. Otherwise, ref_layer_id[i] syntax elements may be present.

Overlay and Background Grouping, e.g., the OverlayAndBackgroundGroupingBox, is another entity grouping with a grouping_type equal to 'ovbg' that specifies tracks and image items containing overlays and background visual media that are intended to be presented together.

The syntax of the OverlayAndBackgroundGroupingBox may be as shown below:

```
aligned(8) class OverlayAndBackgroundGroupingBox(version, flags)
extends EntityToGroupBox('ovbg', version, flags) {
   for(i=0; i<num_entities_in_group; i++) {
      bit(6) reserved = 0;
      unsigned int(1) overlay_flag[i];
      unsigned int(1) backgroud_flag[i];
   }
}
``` overlay_flag[i] equal to 0 specifies that the entity does not contain any overlays. overlay_flag[i] equal to 1 specifies that the entity contains one or more overlays. background_flag[i] equal to 0 specifies that the entity does not contain background visual media. background_flag[i] equal to 1 specifies that the entity contains background visual media. One or both of overlay_flag[i] and background_flag[i] may be equal to 1 for each value of i in the range of 0 to num_entities_in_group−1, inclusive.

The Matroska file format is capable of (but not limited to) storing any of video, audio, picture, or subtitle tracks in one file. Matroska file extensions include .mkv for video (with subtitles and audio), .mk3d for stereoscopic video, .mka for audio-only files, and .mks for subtitles only. Matroska may be used as a basis format for derived file formats, such as WebM.

Matroska uses Extensible Binary Meta Language (EBML) as a basis. EBML specifies a binary and octet (byte) aligned format inspired by the principle of eXtensible Markup Language (XML). EBML itself is a generalized description of the technique of binary markup. A Matroska file consists of Elements that make up an EBML "document." Elements incorporate an Element ID, a descriptor for the size of the element, and the binary data itself. Elements can be nested.

A Segment Element of Matroska is a container for other top-level (level 1) elements. A Matroska file may comprise (but is not limited to being composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats"). MPEG DASH and 3GP-DASH are technically close to each other and may therefore be collectively referred to as DASH. Some concepts, formats, and operations of DASH are described below as an example of a video streaming system, wherein an example embodiment may be implemented. The aspects of certain embodiments of this disclosure are not limited to DASH, but rather the description is given for one possible basis on top of which certain embodiments of the disclosure may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MPD provides the necessary information for clients to establish a dynamic adaptive streaming over HTTP. The MPD contains information describing media presentation, such as an HTTP-uniform resource locator (URL) of each Segment to make a GET Segment request.

To play the content, the DASH client may obtain the MPD by using HTTP, email, thumb drive, broadcast, or other transport methods, for example. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and/or other content characteristics. Using this information, the DASH client may select the appropriate encoded alternative and start streaming the content by fetching the segments using HTTP GET requests, for example. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. A media content component type may be defined as a single type of media content such as audio, video, or text. A media stream may be defined as an encoded version of a media content component.

In DASH, a hierarchical data model is used to structure a media presentation as follows. A media presentation consists of a sequence of one or more Periods, each Period contains one or more Groups, each Group contains one or more Adaptation Sets, each Adaptation Set contains one or more Representations, and each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, such as by bitrate, resolution, language, codec, or the like, for example. The Segment contains a certain duration of media data, and metadata to decode and present the included media content. A Segment is identified by a URI and can typically be requested by an HTTP GET request. A Segment may be defined as a unit of data associated with an HTTP-URL and optionally a byte range that may be specified by an MPD.

The DASH MPD complies with Extensible Markup Language (XML) and is therefore specified through elements and attributes as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, such as ImportantElement, for example. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute, for example. To point to a specific attribute @attribute contained in an element Element, one may write Element@attribute. If an attribute's name consists of two or more combined words, camel-casing may be used after the first word, such as @veryImportantAttribute, for example. Attributes may have assigned a status in the XML as mandatory (M), optional (O), optional with default value (OD) and conditionally mandatory (CM).

In DASH, all descriptor elements are typically structured in the same way, in that they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be differently specified, such as in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, e.g., the processing of one of the descriptors with an identical value for @id is sufficient. Two elements of type DescriptorType are equivalent, if the element name, the value of the @schemeIdUri and the value of the @value attribute are equivalent. If the @schemeIdUri is a URN, then equivalence may refer to lexical equivalence as defined, for example, in clause 5 of RFC 2141. If the @schemeIdUri is a URL, then equivalence may refer to equality on a character-for-character basis as defined, for example, in clause 6.2.1 of RFC3986. If the @value attribute is not present, equivalence may be determined by the equivalence for @schemeIdUri only. Attributes and elements in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized, the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

MPEG-DASH specifies a Viewpoint element that is formatted as a property descriptor. The @schemeIdUri attribute of the Viewpoint element is used to identify the viewpoint scheme employed. Adaptation Sets containing non-equivalent Viewpoint element values contain different media content components. The Viewpoint elements may equally be applied to media content types that are not video. Adaptation Sets with equivalent Viewpoint element values are intended to be presented together. This handling should be applied equally for recognized and unrecognized @schemeIdUri values.

SRD (Spatial Relationship Description) is specified in the normative Annex H of MPEG-DASH. The SRD scheme allows Media Presentation Description authors to express spatial relationships between Spatial Objects. A Spatial Object is represented by either an Adaptation Set or a Sub-Representation. As an example, a spatial relationship may express that a video represents a spatial part of another full-frame video (e.g. a region of interest, or a tile).

The SupplementalProperty and/or EssentialProperty descriptors with @schemeIdUri equal to "urn:mpeg:dash:srd:2014" are used to provide spatial relationship information associated with the containing Spatial Object. SRD may be contained exclusively in these two MPD elements (AdaptationSet and SubRepresentation).

Sub-Representation level SRDs may be used to represent Spatial Objects in one Representation such as HEVC tiling streams. In that case, SRD descriptors may be present at the Adaptation Set as well as the Sub-Representation levels.

The @value of the SupplementalProperty or EssentialProperty elements using the SRD scheme is a comma separated list of values for SRD parameters. In an example embodiment, the SRD parameters source_id, object_x, object_y, object_width, and object_height are required to be present and the SRD parameters total_width, total_height, and spatial_set_id are conditionally or optionally present.

source_id is a non-negative integer in decimal representation providing the identifier for the source of the content. The source_id parameter provides a unique identifier, within the Period, for the source of the content. It implicitly defines a coordinate system associated with this source. This coordinate system uses an arbitrary origin (0; 0); the x-axis is oriented from left to right and the y-axis from top to bottom. All SRD sharing the same source_id value have the same origin and axes orientations. Spatial relationships for Spatial Objects using SRD with different source_id values are undefined.

For a given source_id value, a reference space is defined, corresponding to the rectangular region encompassing the entire source content, whose top-left corner is at the origin of the coordinate system. The total_width and total_height values in an SRD provide the size of this reference space expressed in arbitrary units. total_width is a non-negative integer in decimal representation expressing the width of the reference space in arbitrary units. total_height is a non-negative integer in decimal representation expressing the height of the reference space in arbitrary units. It is allowed that there is no Spatial Object in the MPD that covers the entire source of the content, e.g. when the entire source content is represented by two separate videos.

object_x is a non-negative integer in decimal representation expressing the horizontal position of the top-left corner of the Spatial Object in arbitrary units. object_y is a non-negative integer in decimal representation expressing the vertical position of the top-left corner of the Spatial Object in arbitrary units. object_width is a non-negative integer in decimal representation expressing the width of the Spatial Object in arbitrary units. object_height is a non-negative integer in decimal representation expressing the height of the Spatial Object in arbitrary units. The object_x and object_y parameters (respectively object_width and object_height) express 2D positions (respectively 2D sizes) of the associated Spatial Object in the coordinate system associated with the source. The values of the object_x, object_y, object_width, and object_height parameters are relative to the values of the total_width and total_height parameters, as defined above. Positions (object_x, object_y) and sizes (object_width, object_height) of SRDs sharing the same source_id value may be compared after taking into account the size of the reference space, e.g., after the object_x and object_width values are divided by the total_width value and the object_y and object_height values are divided by the total_height value of their respective descriptors. Different total_width and total_height values may be used in different descriptors to provide position and size information in different units for the same reference space.

spatial_set_id is a non-negative integer in decimal representation providing an identifier for a group of Spatial Objects. When not present, the Spatial Object associated with this descriptor does not belong to any spatial set and no spatial set information is given. MPD authors can express, using the spatial_set_id parameter, that some Spatial Objects, within a given source_id, have a particular spatial relationship. For instance, an MPD author may group all Adaptation Sets corresponding to tiles at the same resolution level. Therefore, the spatial_set_id parameter may be used by the DASH client to quickly select spatially related Spatial Objects.

Referring now to FIG. 2, the apparatus 20 of some embodiments includes, is associated with or is otherwise in communication with processing circuitry 22, a memory 24, a communication interface 26 and optionally, a user interface 28 as shown in FIG. 2. The apparatus of some embodiments may be provided by any of a wide variety of computing devices including, for example, a video encoder, a video decoder, a computer workstation, a server or the like, or by any of various mobile computing devices, such as a mobile terminal, e.g., a smartphone, a tablet computer, a video game player, etc. Alternatively, the apparatus may be embodied by a virtual reality system, such as a virtual reality headset, including, for example, virtual reality glasses, capable of receiving one or more data streams and rendering visual and audiovisual content that can be presented to a user.

The processing circuitry 22 may be in communication with the memory device 24 via a bus for passing information among components of the apparatus 20. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device including the processing circuitry). The memory device may be configured to store information, data, content, applications, instructions, or the like for enabling the apparatus to carry out various functions in accordance with some embodiments of the present disclosure. For example, the memory device could be configured to buffer input data for processing by the processing circuitry. Additionally or alternatively, the memory device could be configured to store instructions for execution by the processing circuitry.

The apparatus 20 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement some embodiments of the present invention on a single chip or as a single "system on a chip." As such, in some cases, a chip or chipset may constitute means for performing one or more operations for providing the functionalities described herein.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In some embodiments, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to some embodiments of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ some embodiments of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 26 may be any means such as a device or circuitry embodied in either hardware or a combination of hardware and software that is configured to receive and/or transmit data, including visual content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 20 is configured to process the visual content in the form of video or image files and render the visual content in the form of video or image files, the apparatus 20 may optionally include a user interface 28 that may, in turn, be in communication with the processing circuitry 22 to provide output to the user, such as by rendering the visual content in the form of video or image files and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 24, and/or the like).

Referring now to FIG. 3, the operations performed, such as by the apparatus 20 of FIG. 2 embodied by or otherwise associated with a source computing device are depicted. As shown in block 30, the apparatus includes means, such as the processing circuitry 22, the memory 24 or the like, for creating a viewpoint position structure for media content. In some embodiments, the viewpoint position structure specifies a position of a viewpoint defined in a coordinate system (e.g., a reference coordinate system) and/or an offset of the reference coordinate system with respect to a geographical reference. In some embodiments, the viewpoint position structure further specifies whether the media content is augmented reality media content. In some embodiments, the viewpoint position structure further comprises a viewpoint group description for the viewpoint. In some embodiments, the viewpoint position structure further comprises a flag indicating that the offset of the reference coordinate system with respect to a geographical reference is present.

As shown in block 32, the apparatus includes means, such as the processing circuitry 22, the memory 24 or the like, for causing storage of the viewpoint position structure, such as in the memory.

An example viewpoint position structure that is compatible with OMAF is described below. The current OMAFv2 specification allows having multiple viewpoints in a viewpoint group. The position of each viewpoint is specified according to its common reference coordinate system. However, the origin of the common reference coordinate system is not tied to real world coordinates. There is provision for specifying a global positioning system (GPS) position for a viewpoint. However, an example embodiment specifies the offset of the common reference coordinate system with respect to a commonly available geographical reference such as magnetic or geographical north. Magnetic north may be relatively easier to obtain with availability of magnetometers on mobile devices. Furthermore, a VR player may also be equipped with a geo-positioning system is commonplace. Three example alternatives of a viewpoint position structure for specifying the rotation in terms of an offset with respect to the magnetic north are provided.

Syntax of a first alternative of the viewpoint position structure is provided below:

```
aligned(8) ViewpointPosStruct( ) {
    signed int(32) viewpoint_pos_x;
    signed int(32) viewpoint_pos_y;
    signed int(32) viewpoint_pos_z;
    unsigned int(1) viewpoint_gpspos_present_flag;
    bit(31) reserved = 0;
    if(viewpoint_gpspos_present_flag) {
        signed int(32) viewpoint_gpspos_longitude;
        signed int(32) viewpoint_gpspos_latitude;
        signed int(32) viewpoint_gpspos_altitude;
        signed int(32) viewpoint_geomagnetic_yaw;
        signed int(32) viewpoint_geomagnetic_pitch;
        signed int(32) viewpoint_geomagnetic_roll;
    }
}
``` viewpoint_gpspos_present_flag may be equal to 1 for location aware VR content. viewpoint_geomagnetic_yaw, viewpoint_geomagnetic_pitch, and viewpoint_geomagnetic_roll specify the yaw, pitch, and roll angles, respectively, of the rotation angles of X, Y, Z axes of the common reference coordinate system relative to the geomagnetic reference direction (geomagnetic North, true North or any suitable reference direction), such as in units of $2^{-16}$ degrees. In one example, viewpoint_geomagnetic_yaw may be in the range of $-180*2^{16}$ to $180*2^{16}-1$, inclusive, and viewpoint_geomagnetic_pitch may be in the range of $-90*2^{16}$ to $90*2^{16}$, inclusive. In this example, viewpoint_geomagnetic_roll may be in the range of $-180*2^{16}$ to $180*2^{16}-1$, inclusive. Other semantics may be the same as provided in OMAF v2.

viewpoint_pos_x, viewpoint_pos_y, and viewpoint_pos_z specify the position of the viewpoint (when the position of the viewpoint is static) or the initial position of viewpoint (when the position of the viewpoint is dynamic), such as in units of $10^{-1}$ millimeters, in 3D space, relative to the common reference coordinate system. If a viewpoint is associated with a timed metadata track with sample entry type 'dyvp', the position of the viewpoint is dynamic. Otherwise, the position of the viewpoint is static. In the former case, the dynamic position of the viewpoint is signalled in the associated timed metadata track with sample entry type 'dyvp'. viewpoint_gpspos_present_flag equal to 1 indicates that viewpoint_gpspos_longitude, viewpoint_gpspos_latitude, and viewpoint_gpspos_altitude are present. viewpoint_gpspos_present_flag equal to 0 indicates that viewpoint_gpspos_longitude, viewpoint_gpspos_latitude, and viewpoint_gpspos_altitude are not present.

viewpoint_gpspos_longitude indicates the longitude of the geolocation of the viewpoint, such as in units of $2^{-23}$ degrees. In an example, viewpoint_gpspos_longitude may be in range of $-180*2^{23}$ to $180*2^{23}-1$, inclusive. In this embodiment, positive values represent eastern longitude and negative values represent western longitude. viewpoint_gpspos_latitude indicates the latitude of the geolocation of the viewpoint, such as in units of $2^{-23}$ degrees. viewpoint_gpspos_latitude may be in range of $-90*2^{23}$ to $90*2^{23}-1$, inclusive. In an example embodiment, positive values represent northern latitude and negative values represent southern latitude. viewpoint_gpspos_altitude indicates the altitude of the geolocation of the viewpoint, such as in units of millimeters. vwpt_group_description is a null-terminated UTF-8 string which indicates the description of a viewpoint group.

Syntax of a second alternative of the viewpoint position structure is provided below:

```
aligned(8) ViewpointPosStruct( ) {
   signed int(32) viewpoint_pos_x;
   signed int(32) viewpoint_pos_y;
   signed int(32) viewpoint_pos_z;
   unsigned int(1) viewpoint_gpspos_present_flag;
   bit(31) reserved = 0;
   if(viewpoint_gpspos_present_flag) {
      signed int(32) viewpoint_gpspos_longitude;
      signed int(32) viewpoint_gpspos_latitude;
      signed int(32) viewpoint_gpspos_altitude;
   }
}
aligned(8) class ViewpointGlobalCoordinateSysRotationStruct( ) {
   signed int(32) viewpoint_gcs_yaw;
   signed int(32) viewpoint_gcs_pitch;
   signed int(32) viewpoint_gcs_roll;
}
aligned(8) class ViewpointGroupStruct( ) {
   unsigned int(8) vwpt_group_id;
   string vwpt_group_description;
}
aligned(8) class ViewpointGeomagneticCoordinateSysRotationStruct( ) {
   signed int(32) viewpoint_geomagnetic_yaw;
   signed int(32) viewpoint_geomagnetic_pitch;
   signed int(32) viewpoint_geomagnetic_roll;
}
``` viewpoint_geomagnetic_yaw, viewpoint_geomagnetic_pitch, and viewpoint_geomagnetic_roll specify the yaw, pitch, and roll angles, respectively, of the rotation angles of X, Y, Z axes of the common reference coordinate system relative to the geomagnetic reference direction, such as in units of $2^{-16}$ degrees. In an example embodiment, viewpoint_geomagnetic_yaw may be in the range of $-180*2^{16}$ to $180*2^{16}-1$, inclusive, viewpoint_geomagnetic_pitch may be in the range of $-90*2^{16}$ to $90*2^{16}$, inclusive, and viewpoint_geomagnetic_roll may be in the range of $-180*2^{16}$ to $180*2^{16}-1$, inclusive.

Syntax of a third alternative of the viewpoint position structure is provided below:

```
aligned(8) ViewpointPosStruct( ) {
   signed int(32) viewpoint_pos_x;
   signed int(32) viewpoint_pos_y;
   signed int(32) viewpoint_pos_z;
   unsigned int(1) viewpoint_gpspos_present_flag;
   bit(31) reserved = 0;
   if(viewpoint_gpspos_present_flag) {
      signed int(32) viewpoint_gpspos_longitude;
      signed int(32) viewpoint_gpspos_latitude;
      signed int(32) viewpoint_gpspos_altitude;
      signed int(32) viewpoint_geomagnetic_yaw;
      signed int(32) viewpoint_geomagnetic_pitch;
      signed int(32) viewpoint_geomagnetic_roll;
   }
   else {
      signed int(32) viewpoint_ref_signal_yaw;
      signed int(32) viewpoint_ref_signal_pitch;
      signed int(32) viewpoint_ref_signal_roll;
   }
}
``` viewpoint_ref_signal_yaw, viewpoint_ref_signal_pitch, and viewpoint_ref_signal_roll specify the yaw, pitch, and roll angles, respectively, of the rotation angles of X, Y, Z axes of the common reference coordinate system relative to the geomagnetic reference direction, such as in units of $2^{-16}$ degrees. In an example embodiment, viewpoint_ref_signal_yaw may be in the range of $-180*2^{16}$ to $180*2^{16}-1$, inclusive, viewpoint_ref_signal_pitch may be in the range of $-90*2^{16}$ to $90*2^{16}$, inclusive, and viewpoint_ref_signal_roll may be in the range of $-180*2^{16}$ to $180*2^{16}-1$, inclusive.

In some embodiments, AR support for content rendering may be implemented by specifying a new type of viewpoint which is not limited to VR, but is also expected to be used in see-through mode or AR/XR mode. Such specifying may be done by signaling of viewpoint for AR, requiring the user to be present in the specified physical location, which may also require the GPS flag to be 1 (as in case of location aware VR) and orientation offset defined.

Example syntax is provided below:

```
aligned(8) class ViewpointTrackGroupBox extends
TrackGroupTypeBox('vipo') {
   string viewpoint_label;
   unsigned int(1) viewpoint_ar_flag;
   bit(6) reserved = 0;
   ViewpointPosStruct( );
   ViewpointGroupStruct( );
   ViewpointGlobalCoordinateSysRotationStruct( );
}
aligned(8) class ViewpointGeomagneticCoordinateSysRotationStruct( ) {
   signed int(32) viewpoint_geomagnetic_yaw;
   signed int(32) viewpoint_geomagnetic_pitch;
   signed int(32) viewpoint_geomagnetic_roll;
}
```

Viewpoint_ar_flag may be 1 if the viewpoint is expected to be used for augmented reality consumption. The viewpoint may have viewpoint_gpspos_present_flag in the ViewpointPosStruct( ) as 1. The viewpoint_geomagnetic_yaw, viewpoint_geomagnetic_pitch and viewpoint_geomagnetic_roll may be defined as described in ViewpointGeomagneticCoordinateSysRotationStruct or signalled as part of ViewpointPosStruct( ). In some embodiments, when the viewpoint_ar_flag is set, it may indicate that the background is transparent, substantially transparent, mostly transparent, partially transparent, that only a part of the background is transparent, that some parts of the background are more or less transparent than other parts, etc. Consequently, whenever the viewpoint content is less than 360 degree content coverage, the rest of the sphere region will be rendered transparently. In some embodiments, signaling of viewpoint information without full media or in some cases, no media, may require additional signaling and semantics.

In some embodiments related to OMAF v2, a new overlay control flag may be defined in clause 7.13.2 of the working draft to specify that a particular overlay could be rendered without background e.g. without rendering the background delivered from the server but as see-through AR. The overlay position in the common reference coordinate system would be relative to the 'ovbg' entity grouping viewpoint. The properties of such a viewpoint such as initial viewpoint group, initial viewpoint guide player operation. In some embodiments, if the overlay control structure for "rendered without background" is true, the background content 'rwpk' may indicate a picture size as less as 0. In some embodiments, a flag is added to denote that the particular overlay may also be rendered in AR mode. In some embodiments, If the overlay source is from a track, with overlay and background grouped in the same track, the track is also an AR mode overlay track, and there is only one overlay in a track containing OverlayConfigBox, the packed_reg_width and packed_reg_height may be equal to packed_picture_width and packed_picture_height, respectively.

In some embodiments, the following syntax, by way of example, is provided:

```
aligned(8) class AROverlay ( ) {
  unsigned int(8) alpha_blending_mode
```

In case AROverlay control struct flag overlay_control_flag[14] as well as overlay_control_flag[3] are 1, the overlay can be rendered in AR mode without the background (if 'rwpk' size is 0).

In some embodiments, in order to indicate to the client that particular content is meant for AR consumption, the overlay tracks may be retrieved exclusively (e.g. without retrieving the background content tracks) and the background content tracks may be optional.

In some embodiments related to DASH, a new attribute is present in a ViewpointInfo container element in a 'vwpt' descriptor to indicate whether a viewpoint is expected to be used for AR consumption is introduced. An OMAF player may use this signaling in association with the 'ovbg' association to determine the order or preference for content selection from the MPD. An example is provided below:

| Elements and attributes for VWPT descriptor | Use | Data type | Description |
|---|---|---|---|
| ViewpointInfo @mode | O | xs:int | Specifies if viewpoint is rendered only as VR (ViewpointInfo@mode equal to 0). ViewpointInfo@mode equal to 1 indicates AR mode, indicating background is absent. ViewpointInfi@mode equal to 2 indicates see-through mode is enabled if background content coverage is less than full sphere. |

In some embodiments, the "rendered without background" flag for overlay is signaled in addition to the currently signaled overlay_id and priority in the 'ovly' descriptor. This enables the player to efficiently select the appropriate representation set for retrieving the media. An example is provided below:

| Elements and Attributes for OVLY descriptor | Use | Data type | Description |
|---|---|---|---|
| @no_background | O | Xs:boolean | Specifies OVLY@no_bacgkround is equal to 0, the overlay is always rendered with background. OVLY@no_background is equal to 1, the overlay can be rendered without background, as specified in clause 7.13.2.14 |

While described above in conjunction with some embodiments utilizing MPEG OMAF, the method, apparatus 20 and computer program product of other example embodiments need not utilize MPEG OMAF and may, instead, utilize other formats. Further, while the method, apparatus and computer program product are provided above in conjunction with a client-server architecture, the method, apparatus and computer program product of other example embodiments may be supported by other types of architectures including point-to-point conversational architectures, point-to-multipoint (multicast or broadcast) architectures, peer-to-peer architectures or the like.

As described above, FIG. 3 is a flowchart of an apparatus 20, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 24 of an apparatus employing some embodiments of the present invention and executed by processing circuitry 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 3 and 4. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Modifications, additions, or amplifications to the operations above may be performed in any order and in any combination.

A method, apparatus and computer program product are provided in accordance with some embodiments in order to align coordinates in virtual reality media content with real world location.

In one example embodiment, a method is provided that includes creating a viewpoint position structure for media content. In some embodiments, the method further includes causing storage of the viewpoint position structure. In some embodiments, the viewpoint position structure specifies a position of a viewpoint defined in a reference coordinate system and/or an offset of the reference coordinate system with respect to a geographical reference. In some embodiments, the method can further comprise creating an indication whether the media content is augmented reality media content. In some embodiments, the augmented reality media content comprises a background that is at least partially transparent. In some embodiments, the indication whether the media content is augmented reality media content is signaled in the viewpoint position structure. In some embodiments, the indication whether the media content is augmented reality media content is signaled in a Dynamic Adaptive Streaming over Hypertext transfer protocol (DASH) descriptor. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

In some implementations of such a method, the viewpoint position structure further specifies whether the media content is augmented reality media content. In some embodiments, the viewpoint position structure further specifies whether the media content is augmented reality media content. In some embodiments, the viewpoint position structure further comprises a viewpoint group description for the viewpoint. In some embodiments, the viewpoint position structure further comprises a flag indicating that the offset of the reference coordinate system with respect to a geographical reference is present and the viewpoint position structure further defines a real world position with respect to the geographical reference as a requirement for rendering of the media content.

In another example embodiment, an apparatus is provided that includes processing circuitry and at least one memory including computer program code for one or more programs with the at least one memory and the computer program code configured to, with the processing circuitry, cause the apparatus at least to create a viewpoint position structure for media content. In some embodiments, the computer program code is further configured to, with the at least one processor, cause the apparatus to cause storage of the viewpoint position structure. In some embodiments, the viewpoint position structure specifies a position of a viewpoint defined in a reference coordinate system and an offset of the reference coordinate system with respect to a geographical reference. In some embodiments, the at least one memory and the computer program code are further configured to, with the at least one processor, cause the apparatus to: create an indication whether the media content is augmented reality media content. In some embodiments, the augmented reality media content comprises a background that is at least partially transparent. In some embodiments, the indication whether the media content is augmented reality media content is signaled in the viewpoint position structure. In some embodiments, the indication whether the media content is augmented reality media content is signaled in a Dynamic Adaptive Streaming over Hypertext transfer protocol (DASH) descriptor. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

In some implementations of such an apparatus, the viewpoint position structure further specifies whether the media content is augmented reality media content. In some embodiments, the viewpoint position structure further specifies whether the media content is augmented reality media content. In some embodiments, the viewpoint position structure further comprises a viewpoint group description for the viewpoint. In some embodiments, the viewpoint position structure further comprises a flag indicating that the offset of the reference coordinate system with respect to a geographical reference is present and the viewpoint position structure further defines a real world position with respect to the geographical reference as a requirement for rendering of the media content.

In one example embodiment, a computer program product is provided that includes at least one non-transitory computer-readable storage medium having computer executable program code instructions stored therein with the computer executable program code instructions comprising program code instructions configured, upon execution, to create a viewpoint position structure for media content. In some embodiments, the computer executable program code instructions comprise program code instructions are further configured, upon execution, to cause storage of the viewpoint position structure. In some embodiments, the viewpoint position structure specifies a position of a viewpoint defined in a reference coordinate system and an offset of the reference coordinate system with respect to a geographical reference. In some embodiments, the computer executable program code instructions further comprise program code instructions configured, upon execution, to: create an indication whether the media content is augmented reality media content. In some embodiments, the augmented reality media content comprises a background that is at least partially transparent. In some embodiments, the indication whether the media content is augmented reality media content is signaled in the viewpoint position structure. In some embodiments, the indication whether the media content is augmented reality media content is signaled in a Dynamic Adaptive Streaming over Hypertext transfer protocol (DASH) descriptor. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

In some implementations of such a computer program product, the viewpoint position structure further specifies whether the media content is augmented reality media content. In some embodiments, the viewpoint position structure further specifies whether the media content is augmented reality media content. In some embodiments, the viewpoint position structure further comprises a viewpoint group description for the viewpoint. In some embodiments, the viewpoint position structure further comprises a flag indicating that the offset of the reference coordinate system with respect to a geographical reference is present and the viewpoint position structure further defines a real world position with respect to the geographical reference as a requirement for rendering of the media content.

In one example embodiment, an apparatus is provided that includes means for creating a viewpoint position structure for media content. In some embodiments, the apparatus further includes means for causing storage of the viewpoint position structure. In some embodiments, the viewpoint position structure specifies a position of a viewpoint defined in a reference coordinate system and an offset of the reference coordinate system with respect to a geographical reference. In some embodiments, the apparatus can further comprise means for creating an indication whether the media content is augmented reality media content. In some embodiments, the augmented reality media content comprises a background that is at least partially transparent. In some embodiments, the indication whether the media content is augmented reality media content is signaled in the viewpoint position structure. In some embodiments, the indication whether the media content is augmented reality media content is signaled in a Dynamic Adaptive Streaming over Hypertext transfer protocol (DASH) descriptor. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

In some implementations of such an apparatus, the viewpoint position structure further specifies whether the media content is augmented reality media content. In some embodiments, the viewpoint position structure further specifies whether the media content is augmented reality media content. In some embodiments, the viewpoint position structure further comprises a viewpoint group description for the viewpoint. In some embodiments, the viewpoint position structure further comprises a flag indicating that the offset of the reference coordinate system with respect to a geographical reference is present and the viewpoint position structure further defines a real world position with respect to the geographical reference as a requirement for rendering of the media content.

In some embodiments, an apparatus can be provided that comprises: means for creating a viewpoint position structure for media content, wherein the viewpoint position structure specifies: a position of a viewpoint defined in a reference coordinate system, and an offset of the reference coordinate system with respect to a geographical reference; and means for causing storage of the viewpoint position structure. In some embodiments, the apparatus can further comprise: means for creating an indication whether the media content is augmented reality media content. In some embodiments, the augmented reality media content comprises a background that is at least partially transparent. In some embodiments, the indication whether the media content is augmented reality media content is signaled in the viewpoint position structure. In some embodiments, the indication whether the media content is augmented reality media content is signaled in a Dynamic Adaptive Streaming over Hypertext transfer protocol (DASH) descriptor. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

In some embodiments, a method can be carried out that comprises: creating a viewpoint position structure for media content, wherein the viewpoint position structure specifies: a position of a viewpoint defined in a reference coordinate system, and an offset of the reference coordinate system with respect to a geographical reference; the method further comprising: causing storage of the viewpoint position structure. In some embodiments, the method can further comprise: creating an indication whether the media content is augmented reality media content. In some embodiments, the augmented reality media content comprises a background that is at least partially transparent. In some embodiments, the indication whether the media content is augmented reality media content is signaled in the viewpoint position structure. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

In some embodiments, a computer-readable storage medium can be provided that has computer executable program code instructions stored therein. In some embodiments, the computer executable program code instructions can comprise program code instructions configured, upon execution, to: create a viewpoint position structure for media content, wherein the viewpoint position structure specifies: a position of a viewpoint defined in a reference coordinate system; and an offset of the reference coordinate system with respect to a geographical reference; the program code instructions further configured, upon execution, to: cause storage of the viewpoint position structure. In some embodiments, the computer executable program code instructions can further comprise program code instructions configured, upon execution, to: create an indication whether the media content is augmented reality media content. In some embodiments, the augmented reality media content comprises a background that is at least partially transparent. In some embodiments, the offset is determined for one or more coordinate axes of the reference coordinate system relative to a geomagnetic reference direction, based upon one or more of: a viewpoint yaw angle, a viewpoint pitch angle, or a viewpoint roll angle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method comprising:
    creating a viewpoint position structure for media content, wherein the viewpoint position structure specifies:
        a position of a viewpoint defined in a reference coordinate system, and
        an offset of the reference coordinate system with respect to a geomagnetic reference direction, wherein the offset enables alignment of the reference coordinate system with the geomagnetic reference direction relative to one or more coordinate axes of the reference coordinate system; and
    causing storage of the viewpoint position structure.

2. The method of claim 1, further comprising:
    creating an indication whether the media content is augmented reality media content.

3. The method of claim 2, wherein the augmented reality media content comprises a background that is at least partially transparent.

4. The method of claim 2, wherein the indication whether the media content is augmented reality media content is signaled in the viewpoint position structure.

5. The method of claim 2, wherein the indication whether the media content is augmented reality media content is signaled in a Dynamic Adaptive Streaming over Hypertext transfer protocol (DASH) descriptor.

6. The method of claim 1, wherein the offset is determined for the one or more coordinate axes of the reference coordinate system relative to the geomagnetic reference direction, based upon one or more of: a viewpoint yaw angle, a viewpoint pitch angle, or a viewpoint roll angle.

7. The method of claim 1, wherein the viewpoint position structure further comprises a viewpoint group description for the viewpoint.

8. The method of claim 1, wherein the viewpoint position structure further comprises a flag indicating that the offset of the reference coordinate system with respect to the geomagnetic reference direction is present, and wherein the viewpoint position structure further defines a real world position with respect to the geomagnetic reference direction as a requirement for rendering of the media content.

9. An apparatus comprising at least one processor and at least one memory including computer program code, the at least one memory and the computer program code configured to, with the at least one processor, cause the apparatus to:
    create a viewpoint position structure for media content, wherein the viewpoint position structure specifies:
        a position of a viewpoint defined in a reference coordinate system, and
        an offset of the reference coordinate system with respect to a geomagnetic reference direction, wherein the offset enables alignment of the reference coordinate system with the geomagnetic reference direction relative to one or more coordinate axes of the reference coordinate system; and
    cause storage of the viewpoint position structure.

10. The apparatus of claim 9, wherein the at least one memory and the computer program code are further configured to, with the at least one processor, cause the apparatus to:
    create an indication whether the media content is augmented reality media content.

11. The apparatus of claim 10, wherein the augmented reality media content comprises a background that is at least partially transparent.

12. The apparatus of claim 10, wherein the indication whether the media content is augmented reality media content is signaled in the viewpoint position structure.

13. The apparatus of claim 10, wherein the indication whether the media content is augmented reality media content is signaled in a Dynamic Adaptive Streaming over Hypertext transfer protocol (DASH) descriptor.

14. The apparatus of claim 9, wherein the offset is determined for the one or more coordinate axes of the reference coordinate system relative to the geomagnetic reference direction, based upon one or more of: a viewpoint yaw angle, a viewpoint pitch angle, or a viewpoint roll angle.

15. The apparatus of claim 9, wherein the viewpoint position structure further comprises a viewpoint group description for the viewpoint.

16. The apparatus of claim 9, wherein the viewpoint position structure further comprises a flag indicating that the offset of the reference coordinate system with respect to the geomagnetic reference direction is present, and wherein the viewpoint position structure further defines a real world position with respect to the geomagnetic reference direction as a requirement for rendering of the media content.

17. A computer program product comprises at least one non-transitory computer-readable storage medium having computer executable program code instructions stored therein, the computer executable program code instructions comprising program code instructions configured, upon execution, to:

create a viewpoint position structure for media content, wherein the viewpoint position structure specifies:
 a position of a viewpoint defined in a reference coordinate system, and
 an offset of the reference coordinate system with respect to a geomagnetic reference direction, wherein the offset enables alignment of the reference coordinate system with the geomagnetic reference direction relative to one or more coordinate axes of the reference coordinate system; and
cause storage of the viewpoint position structure.

18. The computer program product of claim 17, wherein the computer executable program code instructions further comprise program code instructions configured, upon execution, to:
 create an indication whether the media content is augmented reality media content.

19. The computer program product of claim 18, wherein the augmented reality media content comprises a background that is at least partially transparent.

20. The computer program product of claim 17, wherein the offset is determined for the one or more coordinate axes of the reference coordinate system relative to the geomagnetic reference direction, based upon one or more of: a viewpoint yaw angle, a viewpoint pitch angle, or a viewpoint roll angle.

* * * * *